United States Patent
Kim et al.

(10) Patent No.: US 7,643,386 B2
(45) Date of Patent: Jan. 5, 2010

(54) OPTICAL PICKUP ACTUATOR AND OPTICAL RECORDING AND/OR REPRODUCING APPARATUS

(75) Inventors: Seok-jung Kim, Suwon-si (KR);
Jung-gug Pae, Suwon-si (KR);
Hyung-hoon Kang, Seould (KR);
Young-man Ahn, Suwon-si (KR);
Tae-youn Heor, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 661 days.

(21) Appl. No.: 11/311,390

(22) Filed: Dec. 20, 2005

(65) Prior Publication Data
US 2006/0136954 A1  Jun. 22, 2006

(30) Foreign Application Priority Data
Dec. 22, 2004 (KR) .................. 10-2004-0110312

(51) Int. Cl.
*G11B 7/00* (2006.01)
(52) U.S. Cl. .................................... 369/44.15
(58) Field of Classification Search ............. 369/44.14, 369/44.15, 44.16, 44.21, 44.32, 53.19
See application file for complete search history.

(56) References Cited
U.S. PATENT DOCUMENTS

| | | | | |
|---|---|---|---|---|
| 5,673,247 A | * | 9/1997 | Sekimoto et al. | ....... 369/112.17 |
| 6,895,593 B2 | * | 5/2005 | Kim et al. | ................... 720/669 |
| 7,168,082 B2 | * | 1/2007 | Takeshita et al. | ......... 369/44.15 |
| 7,194,749 B2 | * | 3/2007 | Hatazawa | .................... 720/683 |
| 7,305,688 B2 | * | 12/2007 | Yang et al. | ................ 369/44.22 |
| 2004/0130978 A1 | | 7/2004 | Hatazawa et al. | |
| 2004/0177365 A1 | | 9/2004 | Takeshita | |
| 2005/0265141 A1 | * | 12/2005 | Pae et al. | ................. 369/44.14 |

FOREIGN PATENT DOCUMENTS

| | | |
|---|---|---|
| EP | 1316949 | 6/2003 |
| EP | 1411504 | 4/2004 |
| EP | 1450356 | 8/2004 |
| JP | 09-171630 | 6/1997 |
| JP | 10-116431 | 5/1998 |
| JP | 2003-263759 | 9/2003 |
| KR | 2004-0019649 | 3/2004 |
| KR | 2004-0069943 | 8/2004 |
| KR | 2004-75474 | 8/2004 |

* cited by examiner

*Primary Examiner*—Thang V Tran
(74) *Attorney, Agent, or Firm*—Roylance, Abrams, Berdo & Goodman, L.L.P.

(57) ABSTRACT

An optical pickup actuator comprises a lens holder having an object lens which focuses a laser beam onto an optical information storage medium mounted thereon. In the optical pickup actuator the lens holder is movably supported by a support member with respect to a base. The optical pickup actuator also comprises a magnetic circuit to drive the lens holder in a focusing direction and a tilt direction independently.

15 Claims, 7 Drawing Sheets

US 7,643,386 B2

OPTICAL PICKUP ACTUATOR AND OPTICAL RECORDING AND/OR REPRODUCING APPARATUS

CROSS REFERENCE TO RELATED APPLICATIONS

This application claims the benefit under 35 U.S.C. § 119(a) of Korean Patent Application No. 2004-110312, filed on Dec. 22, 2004, the entire contents of which are hereby incorporated by reference.

BACKGROUND OF THE INVENTION

1. Field of the Invention

The present invention relates to an optical pickup actuator and an optical recording and/or reproducing apparatus. More particularly, the present invention relates to an optical pickup actuator which has an object lens mounted therein and drives the object lens to record and/or reproduces information on and/or from an optical information storage medium, and an optical recording and/or reproducing apparatus employing the same.

2. Description of the Related Art

Conventionally, a digital versatile disk (DVD) uses a laser at 650 nm (or 635 nm) wavelength and an object lens having an aperture of 0.6 (0.65 in case of recordable object lens) to record and/or reproduce data. If the DVD has a diameter of 120 mm and a track pitch of 0.74 um, it has a recording capacity of 4.7 GB per one side.

Therefore, a DVD is not appropriate for recording of motion picture information of high definition (HD) grade. This is because a recording capacity of 23 GB or more is required per one side of a disc sufficiently to record motion picture information having a running time of 135 minutes in high definition.

In order to satisfy the demand for the high-density recording capacity, a blue laser which has a shorter wavelength than a red laser and an object lens having an apeture larger than 0.6 is used. Also, the developments of high-density optical disks having a narrower track, that is, high definition DV (HD-DVD) and standardization therefore have been promoted.

Meanwhile, in order to guarantee a tolerance due to tilting of an optical disk, a thickness of the optical disk must be decreased because the f-number of aperture of an object lens increases to accommodate high density. Considering an allowable tolerance due to the tilting of the optical disk, a CD must decrease to be 1.2 mm thick and a DVD must decrease to be 0.66 mm thick. Thinness of an HD-DVD may be on the order of 0.1 mm. The f-numbers of apertures of object lenses increase to 0.45 and 0.6 for a CD and a DVD, respectively. In the case of HD-DVD, the f-number of an aperture of an object lens may be on the order of 0.85. Also, the HD-DVD may use a celadon green laser in consideration of its recording capacity. However, one of the main problems in developing a new standard optical disk is whether the new optical disk is compatible with existing optical disks.

A sophisticated technique is required to design and fabricate an object lens having a large aperture such as 0.85. Also, making working distance of the object lens having the large aperture as long as that of an object lens for a DVD is difficult.

Therefore, a compatible optical pickup capable of high-density recording/reproduction which has both at least one object lens for recording/reproducing data on a CD and/or DVD and an object lens having a large aperture for high-density recording is required.

On the other hand, an optical pickup actuator requires a magnetic circuit to be moved both in a focusing direction and a track direction, so that the optical pickup actuator is moved in the focusing direction such that a distance between an optical disk and an object lens is constantly maintained, and moved in the track direction to move an object lens to a desirable track position (track center).

As described above, if an optical pickup is to be configured to accommodate a plurality of optical disks having different recording density, it requires object lenses corresponding to the plurality of optical disks. Therefore, an actuator applied to the optical pickup employing the plurality of object lenses requires a magnetic circuit that is capable of driving at least one object lens mounted in a driving part in a focusing direction, a track direction and a tilt direction, and simultaneously maintaining a high sensitivity.

SUMMARY OF THE INVENTION

The present invention has been developed in order to address the above problems in the related art. Accordingly, an aspect of the present invention is to provide an optical pickup actuator having a simplified and improved structure capable of maintaining a high sensitivity, and an optical recording and/or reproducing apparatus employing the same.

According to an embodiment of the present invention, the above aspect can be achieved by, for example, providing an optical pickup actuator comprising a lens holder where an object lens to focus a laser beam onto an optical information storage medium is mounted, the lens holder being supported by a support member and movable with respect to a base, and a magnetic circuit to drive the lens holder in a focusing direction and a tilt direction independently.

According to an embodiment of the present invention, the magnetic circuit comprises a focusing coil disposed in the lens holder, a pair of tilt coils disposed in the lens holder and driven independently, and a magnet part generating a driving force in the focusing direction due to an interaction with the focusing coil and generating a driving force in the tilt direction due to an interaction with the tilt coils.

According to an embodiment of the present invention, the magnet part comprises a pair of single-pole magnets which correspond to each other with respect to the lens holder and are single-pole-magnetized in the track direction of the optical information storage medium.

According to an embodiment of the present invention, the pair of tilt coils neighbor to each other in the track direction of the optical information storage medium.

According to an embodiment of the present invention, the focusing coil and the tilt coils are overlapped with each other in the focusing direction.

According to an embodiment of the present invention, the focusing coil is located above the tilt coils in the focusing direction.

According to an embodiment of the present invention, the focusing coil is thicker than the tilt coils in the focusing direction.

According to an embodiment of the present invention, working sides of the focusing coil and the tilt coils are parallel to the track direction of the optical information storage medium.

According to an embodiment of the present invention, the magnetic circuit further comprises a plurality of track coils supported by the lens holder to drive the lens holder in the track direction independently.

According to an embodiment of the present invention, a pair of the track coils is disposed on an outer surface of the lens holder that is parallel to the track direction of the optical information storage medium, the track coils in the pair neighboring to each other.

According to an embodiment of the present invention, the magnet part comprises a pair of single-pole magnets facing to each other with respect to the lens holder, the single-pole magnets generating an electromagnetic force in the track direction at the neighboring sides of the track coil in the focusing direction.

According to an embodiment of the present invention, the single-pole magnets have opposite magnetic flux directions.

According to an embodiment of the present invention, the magnetic circuit further comprises an inner yoke disposed inside the focusing coil and the tilt coils, and an outer yoke disposed outside the focusing coil and the tilt coils.

According to an embodiment of the present invention, the outer yoke is disposed on the base to support the single-pole magnets.

According to an embodiment of the present invention, the outer yoke enclose an outer side of each single-pole magnet which is exposed in the track direction, to generate a magnetic flux in an opposite direction to those of the single-pole magnets.

According to an embodiment of the present invention, the outer yoke encloses a part of each single-pole magnet to generate a driving force in the track direction at distal working sides of the track coils which are separated from each other toward the outside in the track direction.

According to an embodiment of the present invention, the lens holder has a plurality of lens mounting holes which are arranged in the track direction of the optical information storage medium to mount the plurality of object lenses.

According to an embodiment of the present invention, the magnetic circuit comprises a pair of tilt coils winding with respect the pair of lens mounting holes, respectively, a single focusing coil winding the pair of lens mounting holes, and a magnet part generating a driving force of a focusing direction by an interaction with the focusing coil and generating a driving force of a tilt direction by an interaction with the tilt coils.

According to an embodiment of the present invention, the lens holder has a coil mounting portion communicating with the lens mounting holes and accommodating the focusing coil and the tilt coils stacked in the focusing direction.

According to an embodiment of the present invention, the lens holder has a coil mounting portion defined therein to support the focusing coil and the tilt coils.

According to an embodiment of the present invention, an optical pickup actuator comprises a lens holder mounting a plurality of object lenses to record and/or reproduce information on and/or from optical information storage media of different recording densities, a support member movably supporting the lens holder with respect to the base, and a magnetic circuit driving the lens holder in a focusing direction and a tilt direction independently.

According to an embodiment of the present invention, the magnet circuit comprises a single focusing coil winding in the focusing direction to correspond to all the plurality of object lenses, a plurality of tilt coils winding with respect to the object lenses, respectively, and disposed in the lens holder, and a pair of single-pole magnets corresponding to each other with respect to the lens holder and single-pole-magnetized in the track direction of the optical information storage medium.

According to an embodiment of the present invention, the magnetic circuit further comprises four track coils, each pair of track coils being disposed at surfaces of the lens holder facing to the single-pole magnets to drive the lens holder in the track direction.

According to an embodiment of the present invention, the track coils are effective coils such that neighboring sides thereof parallel to the focusing direction interact with the single-pole magnets.

According to an embodiment of the present invention, the magnetic circuit comprises a plurality of inner yokes supported on the base and disposed inside the focusing coil and the tilt coils, and an outer yoke disposed on the base to support the single-pole magnets.

According to an embodiment of the present invention, the outer yoke has a substantially bracket-shaped cross section in the focusing direction and encloses the single-pole magnets.

According to an embodiment of the present invention, a portion extending from the outer yoke to neighbor with the single-pole magnets in the track direction face to distal sides of the track coils which are separated from each other in the track direction.

According to an embodiment of the present invention, an optical recording and/or reproducing apparatus, comprises an actuator to drive an object lens, an optical pickup movable in a radial direction of the optical information storage medium and reproducing and/or reproducing information on/from the optical information storage medium, and a controller controlling a focusing, a track and a tilt servos. The actuator comprises a lens holder mounting an object lens, and supported by a support member and movable with respect to a base, and a magnetic circuit driving the lens holder in a focusing direction and a tilt direction independently.

BRIEF DESCRIPTION OF THE DRAWINGS

The above exemplary aspects and other advantages of the present invention will be more apparent from the description of exemplary embodiments of the present invention with reference to the accompanying drawings, in which the same or similar elements, features and structures are represented by the same reference numerals, wherein.

DETAILED DESCRIPTION OF EXEMPLARY EMBODIMENTS

Hereinafter, an optical pickup actuator and an optical recording and/or reproducing apparatus according to exemplary embodiments of the present invention will now be described in greater detail with reference to the accompanying drawings.

Figure 1:
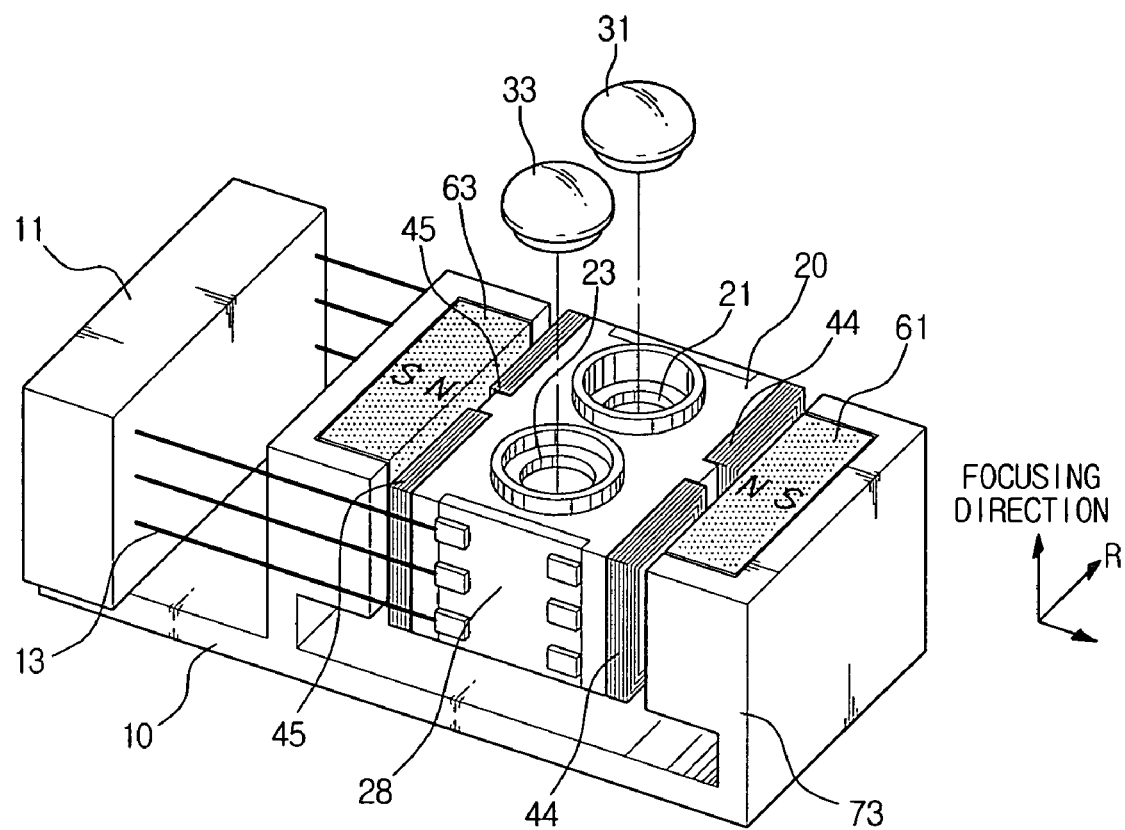
FIG. 1 is an exploded perspective view schematically showing an optical pickup actuator according to an exemplary embodiment of the present invention.
Figure 2:
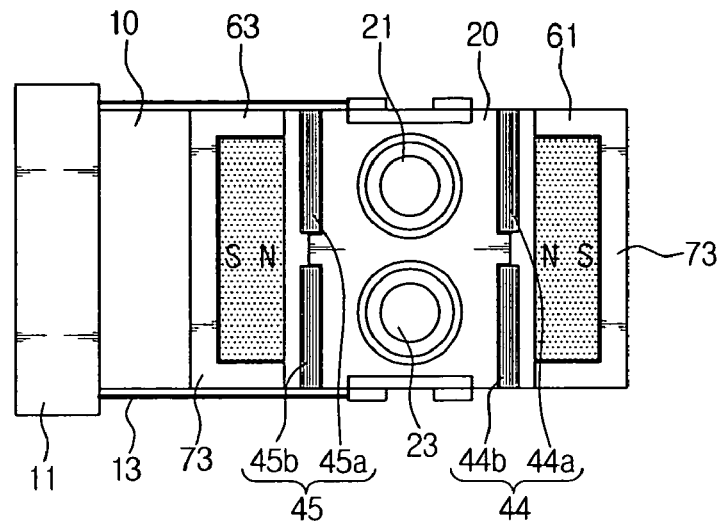
FIG. 2 is a plane view showing the optical pickup actuator of FIG. 1.
Figure 3:
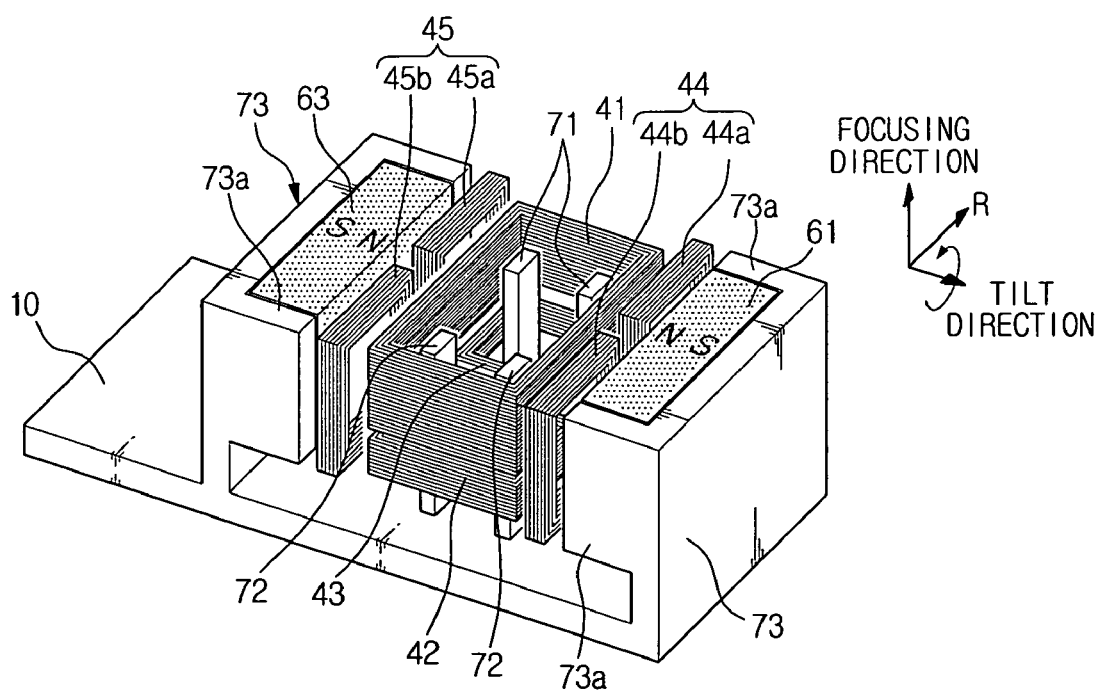
FIG. 3 is a perspective view showing a magnetic circuit from which a lens holder is removed according to an exemplary embodiment of the present invention.

Referring to FIGS. 1, 2 and 3, an optical pickup actuator according to an embodiment of the present invention comprises a support holder 11 supported on a base 10, a lens holder 20 having lens mounting holes 21, 23 for supporting a plurality of object lenses 31, 33 which have different working distances, a support member 13 (for example, a suspension) connecting the lens holder 20 and the support holder 11, and a magnetic circuit to drive the lens holder 20 in a focusing direction, a tilt direction and a track direction, independently.

The plurality of object lenses 31, 33 comprise a first object lens 31 to record/reproduce data on/from at least one kind of low-density optical disks, and a second object lens 33 to record/reproduce data on/from a high-density optical disk. For example, the first object lens 31 is designed to record/reproduce data on/from a low-density optical disk of a DVD family (referred to as a DVD, herein below) and also to record/reproduce data on/from an optical disk of a compact disc (CD) family (referred to as a CD, herein below). The second object lens 33 is designed to record/reproduce data on/from an optical disk of a HD-DVD family which has a higher density that that of the DVD. Herein, the plurality of object lenses 31, 33 may be three or more which have different working distances to record/reproduce data on/from three or more kinds of optical disks of different recording densities.

According to an embodiment of the present invention, the single lens holder 20 provided in the actuator mounts therein the plurality of object lenses 31, 33 so as to align the plurality objects lenses 31, 33 in a track direction which is a radial direction R of an optical information storage medium such as an optical disk. To this end, the actuator has a compatibility with an optical pickup that requires a plurality of object lenses.

If, as shown in an exemplary implementation, the lens holder 20 is designed to mount two object lenses 31, 33, the lens holder 20 has a first lens mounting hole 21 for the first object lens 31 and a second lens mounting hole 23 for the second object lens 33. The number of lens mounting holes formed in the lens holder 20 corresponds to the number of object lens to be mounted.

Figure 4:
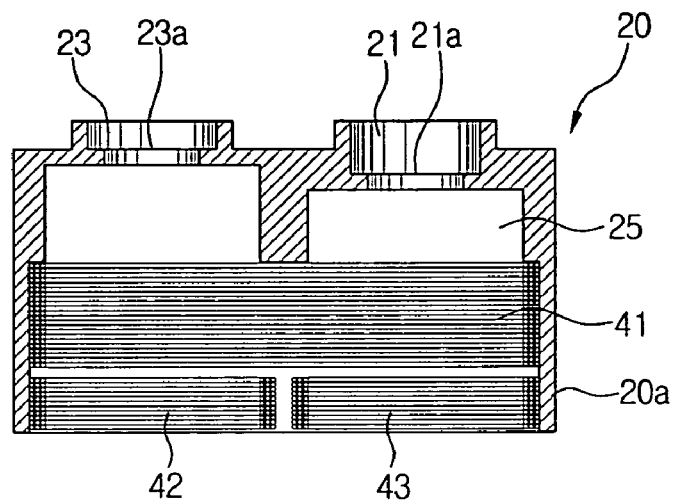
FIG. 4 is a cross-section view showing the lens holder of FIG. 1.

The first and the second lens mounting holes 21, 22 are arranged in the direction R. In an exemplary implementation, the lens mounting holes 21, 23 are formed as shown in FIG. 4 such that the object lenses 31, 33 mounted therein have different heights. More specifically, the first lens mounting hole 21 has a seating projection 21a formed at a relatively deeper position away from an upper surface of the lens holder 20 facing the optical disk, so that the first object lens 31 for a low-density optical disk and having a long working distance is mounted in the first lens mounting hole 21. The second lens mounting hole 23 has a seating projection 23a formed at the same position as the upper surface of the lens holder 20 facing to the optical disk or formed at a position nearer to the upper surface of the lens holder 20 than the seating projection 21a of the first lens mounting hole 21. Accordingly, the second lens mounting hole 23 mounts therein the second object lens 33 for a high-density optical disk and having a short working distance.

The upper surface of the lens holder 20 is opened due to the presence of the lens mounting holes 21, 23, and a lower portion of the lens holder 20 is formed in a hexahedral shape, which is opened through a coil mounting portion 25. In the coil mounting portion 25 are disposed a focusing coil 41 and tilt coils 42, 43, which will be described herein below. The lens holder 20 as constructed above is made of, for example, plastic and formed by, for example, injection molding.

The lens holder 20 is movably supported by the holder 11 through the support member 13. The support member 13 has a predetermined rigidity and preferably is a spring wire which is elastically deformable. A connection board 28 is disposed on an outer surface of the lens holder 20 to be connected with the support member 13. The support member 13 is connected with the connection board 28 by welding. According to an exemplary implementation, an electric current is supplied to the magnetic circuit through the support member 13.

The magnetic circuit is to drive the object lenses 31, 33 in a focusing direction, a track direction (direction R, hereinafter), and a tilt direction, independently. As shown in FIGS. 2 to 4, the magnetic circuit comprises a single focusing coil 41, a pair of tilt coils 42, 43, two pairs of track coils 44, 45 and a pair of single-pole magnets 61, 63.

The focusing coil 41 is arranged to enclose the two object lenses 31, 33. The focusing coil 41, the shape of which resembles a rectangle, winds in close contact with the inner wall of the coil mounting portion 25. The focusing coil 41 is also stacked in a focusing direction to have a predetermined height. Sides of the focusing coil 41 parallel to the direction R interact with the single-pole magnets 61, 63 such that the focusing coil 41 drives the lens holder 20 in the focus direction. When the focusing coil 41 is supplied with an electric current in a clockwise direction or counter-clockwise direction, it ascends or descends in the focusing direction.

The pair of tilt coils 42, 43 neighbor with each other in the track direction. The tilt coils 42, 43 correspond to the object lens 31, 33, respectively, and winds in the focusing direction under the focusing coil 41.

The tilt coils 42, 43 are located under the focusing coil 41 and in close contact with the inner wall of the coil mounting portion 25. According to an exemplary implementation, the tilt coils 42, 43 each wind in the focusing direction with a smaller thickness than that of the focusing coil 41. Accordingly, a force exerted in the focusing direction is generated at the focusing coil 41. The tilt coils 42, 43 are supplied with electric current of different direction, they are subjected to different direction of forces with respect to the focusing direction. Accordingly, the tilt coils 42, 43 are driven independently from the focusing coil 41 and move the lens holder 20 in the tilt direction with a relatively less force than that exerted to the focusing coil 41.

The focusing coil 41 and the title coils 42, 43 are disposed in close contact with the inner wall of the coil mounting portion 25 of the lens holder 20 such that they support a sidewall 20a of the lens holder 20. According to an exemplary implementation, rigidity of the sidewall 20a of the lens holder 20 increases, and thus, it is possible to guarantee a high-pass displacement and a gain margin of a second resonance frequency occurring in the lens holder 20 during the driving operation.

The two pairs of track coils 44, 45 are respectively disposed at outer surfaces of the lens holder, which are parallel to the direction R, each pair neighboring to each other. The track coils 44, 45 are an effective coil, parallel sides of which to the focusing direction are subjected to a force in the track direction. The track coils 44a, 45a facing to each other with respect to the lens holder 20 are supplied with the same directional of electric currents and thus are subjected to the same direction forces. The track coils 44b, 45b neighboring to the track coils 44a, 45a, and facing to each other with respect to the lens holder 20 are subjected to the same direction force when being supplied with opposite direction of forces to those of the tracking coils 44a, 45a.

Figure 7A:
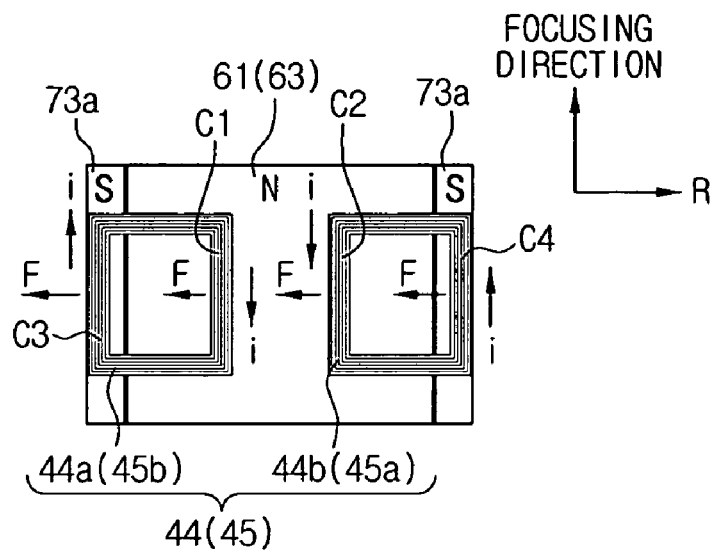
FIGS. 7A and 7B are views showing the operation of driving the lens holder in a track direction according to an exemplary embodiment of the present invention.
Figure 7B:
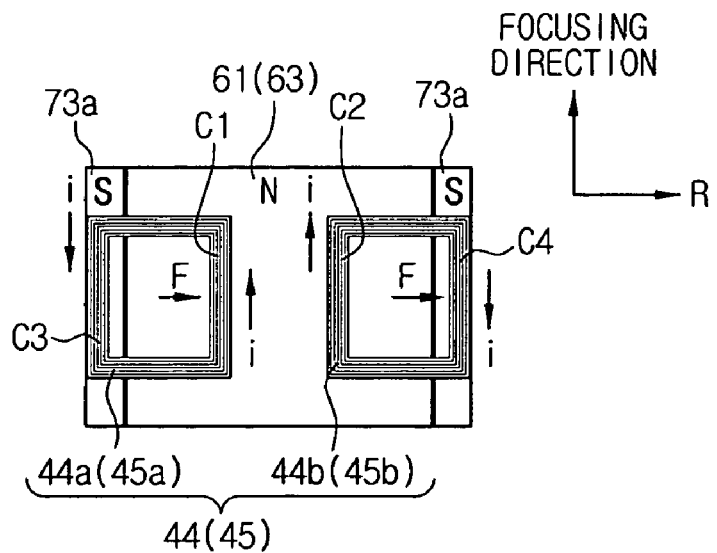

As shown in FIGS. 7A and 7B, working sides C1, C2 of the track coils 44a, 44b or 45a, 45b, which neighbor to each other in the track direction R, correspond to the single-pole magnets 61 or 63. The opposite working sides C3, C4, which are distanced from each other in the track direction R, do not face to the single-pole magnets 61 or 63 and face to an outer yoke 73, which will be described below. In a structure of such an exemplary implantation, due to a magnetic flux coming from the single-pole magnets 61 or 63 and forwarding to the neighboring outer yoke 73, the working sides C3, C4 are subjected to a force in the track direction. That is, if an end of the single-pole magnet 61 or 63 facing to the track coils 44 or 45 has a N-pole, the outer yoke 73 has a S-pole. Accordingly, all sides C1, C2, C3, C4, being parallel to the focusing direction of the tracking coils 44, 45, are subjected to the force in the track direction.

Referring back to FIGS. 2 and 3, the single-pole magnets 61, 63 are arranged parallel to each other in the track direction with the lens holder 20 being disposed therebetween. The single-pole magnets 61, 63 have opposite direction of magnetic fluxes. The single-pole magnets 61, 63 are all used to drive the lens holder 20 in the focusing, tilt, tracking directions independently. In an exemplary embodiment of the present invention, sides of respective single pole magnets 61, 63, which face to each other, have an N-pole.

The magnetic circuit comprises a pair of first inner yokes 71, a pair of second inner yokes 72, and a pair of outer yokes 73.

The first inner yokes 71 are disposed on the base 10 inside the tilt coil 43 and the focusing coil 41. According to an exemplary implementation, the first inner yokes 71 are arranged in correspondence with the effective coil portions of the focusing coil 41 and the tilt coil 43 facing to the single-pole magnets 61, 63, i.e., the portion parallel to the direction R. The first inner yokes 71 may be made of metallic material and integrally formed with the base 10. The first inner yokes 71 guide magnetic force lines which are occurred in the focus and tilt directions at the focusing coil 41 and the tilt coil 43 in non-contact with the focusing coil 41 and the tilt coil 43, and thereby maximize a force of an effective magnetic field.

The second inner yokes 72 neighbor with the first inner yokes 71 in the direction R. That is, the second inner yokes 72 are arranged inside the focusing coil 41 and the tilt coil 42. Since the structures and operations of the second inner yokes 72 are the same as those of the first inner yokes 71, their descriptions will be omitted.

The outer yokes 71 are fixed to the base 10. It may be integrally formed with the base 10. The outer yokes 73 face to the other sides of the respective single pole-magnet 61, 63 which do not face the lens holder 20. According to an exemplary implementation, the outer yokes 73 support the respective single-pole magnets 61, 63. The outer yokes 73 guides magnetic force lines of magnetic fields which are occurred at the respective single-pole magnets 61, 63, and concentrates them toward the lens holder 20, thereby maximizing the force of the effective magnetic field.

The outer yokes 73 have a substantially bracket-shaped cross section in the focus direction. The outer yokes 73 have a pair of extension parts 73a extending to enclose side surfaces of the single pole magnets 61, 63 corresponding to the track direction R. As shown in FIG. 7A, the extension parts 73a face to the sides C3, C4 spaced from each other in the track direction R. Accordingly, the adjacent sides C1, C2 of the track coils 44, 45 are subjected to a force due to the interaction with the single-pole magnets 61, 63, whereas the other sides C3, C4 is subjected to a force in the track direction due to the magnetic force exerted at the extension parts 73a. In an exemplary implementation, since the surfaces of the single-pole magnets 61, 63 facing to the track coils 44, 45 have the N-pole, the extension portions 73a adjacent to the single-pole magnets 61, 63 in the track direction R have the S-pole. As described above, since the outer yokes 73 are extended to enclose the single-pole magnets 44, 45 in the track direction, a force exerted to the track coils 44, 45 in the track direction R increases.

Hereinafter, the operation of the optical pickup actuator according to an embodiment of the present invention will now be described in greater detail.

Firstly, description will be made about a direction of a driving force caused by an interaction between the focusing coil 41 and the single-pole magnets 61, 63.

Figure 5A:
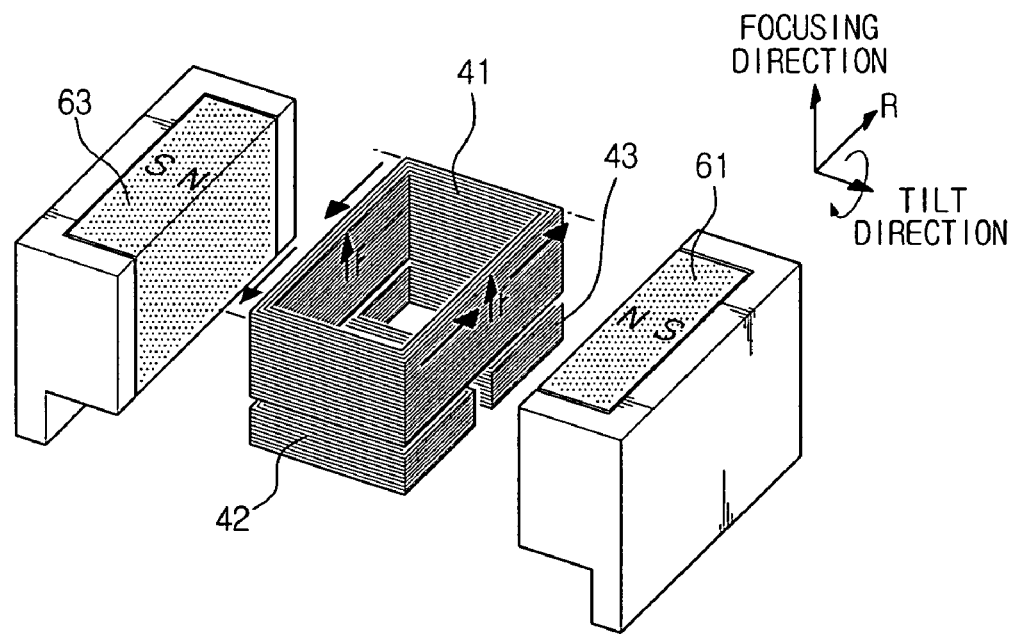
FIGS. 5A and 5B are views showing the operation of driving the lens holder in a focusing direction according to an exemplary embodiment of the present invention.

As shown in FIG. 5A, the single focusing coil 41 is disposed between the single-pole magnets 61, 63. An electric current is supplied to the focusing coil 41 in a counter-clockwise direction. Then, since the facing surfaces of the single-pole magnets 61, 63 have the N pole, magnetic field lines emanate toward their respective S poles. Accordingly, as the electric current is supplied to the focusing coil 41 in the counter clockwise direction, the sides of the focusing coils 41 parallel to the direction R is subjected to an upward force according to the Fleming's left-hand rule. As a result, as shown in FIG. 5A, the lens holder 20, the first and the second object lenses 31, 33, and the driving part including the focusing coil 41, the tilt coils 42, 43 and the track coils 44, 45 are moved upwardly by the force exerted to the focusing coil 41.

When an electric current is supplied the focusing coil 41 in the reverse direction to that of FIG. 5A, i.e., in a clockwise direction, the sides of the focusing coil 41 parallel to the direction R is subjected to a downward force.

As described above, by varying the polarity and amount of the electric currents supplied to the focusing coil 41, the first and the second object lenses 31, 33 mounted in the lens holder 20 can be shifted to different positions in the focusing direction.

Figure 6A:
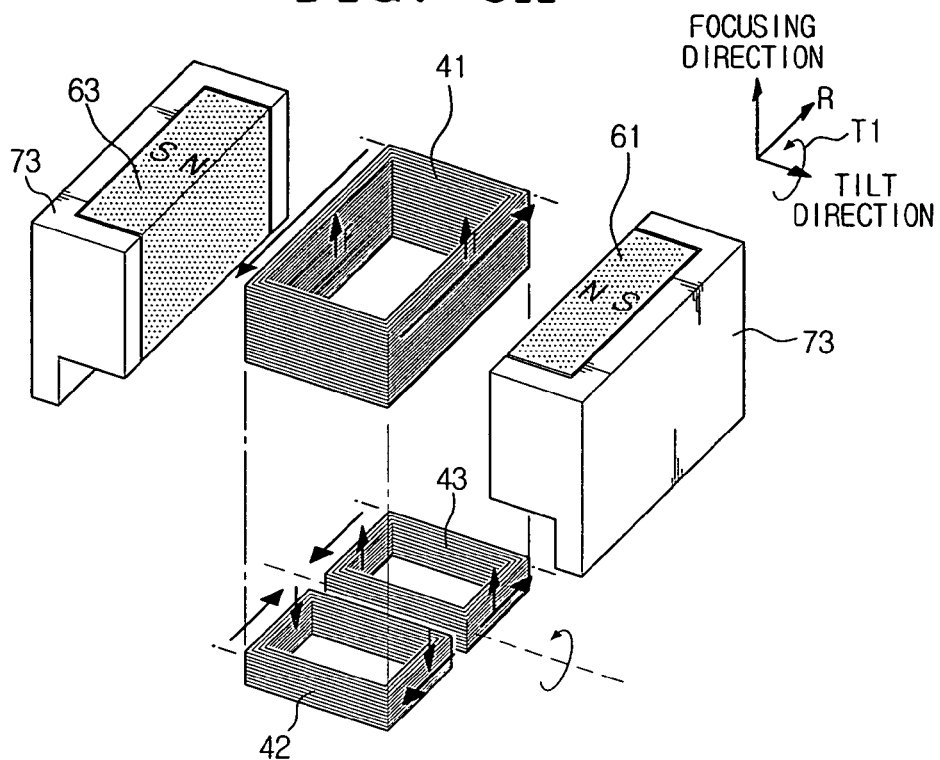
FIGS. 6A and 6B are views showing the operations of driving the lens holder in a focusing direction and a tilt direction, respectively, according to an exemplary embodiment of the present invention.
Figure 6B:
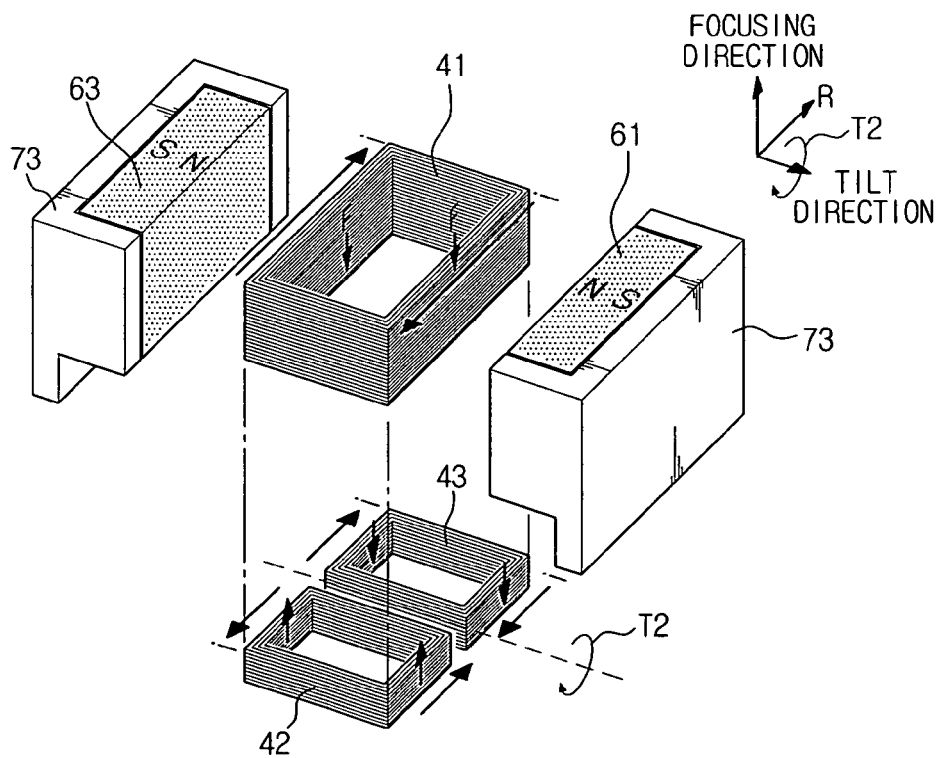

As described above, by supplying the electric current to the focusing coil 41 as shown in FIG. 5A, the lens holder 20 is moved upwardly. At the same time, as shown in FIG. 6A, electric currents are supplied to the tilt coils 42, 43 in the opposite directions. Then, the tilt coils 42, 43 are subjected to forces of opposite directions with respect to the single-pole magnets 61, 63. More specially, the tilt coil 42 being supplied with an electric current of a clockwise direction is subjected to a downward force with reference to the focusing direction. The tilt coil 43 being supplied with an electric current of a counter clockwise direction is subjected to an upward force. Accordingly, the respective tilt coils 42, 43 are driven independently from the focusing coil 41 to thereby tilt-drive the lens holder 20 in the direction T1.

Figure 5B:
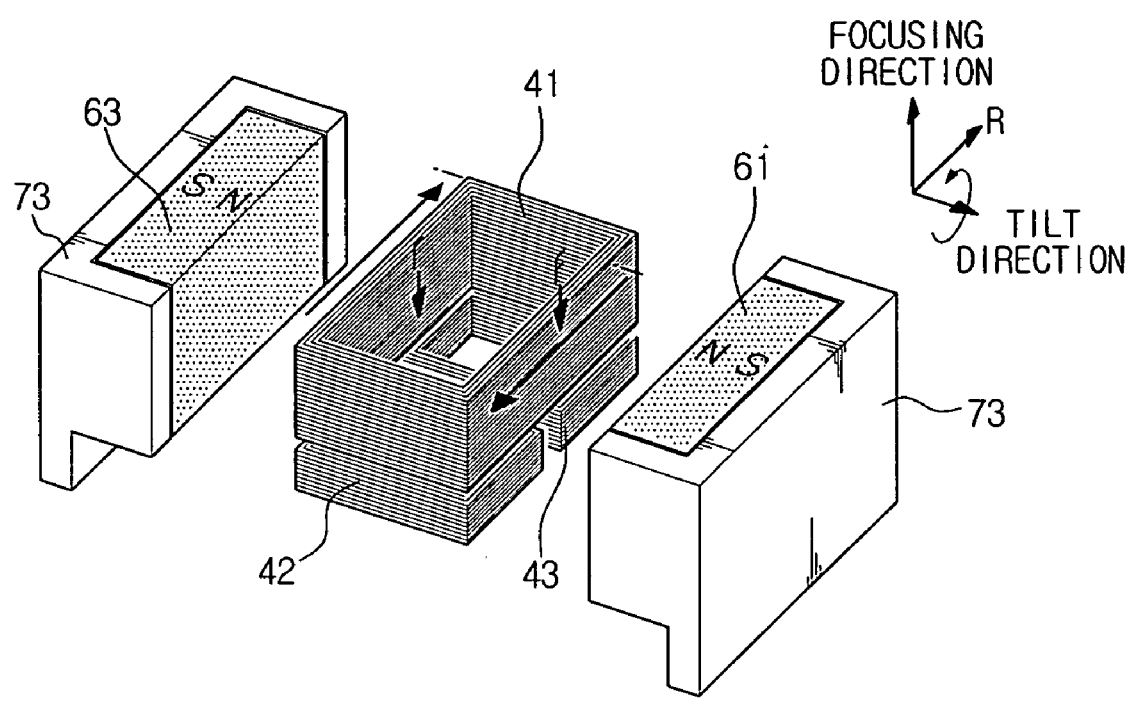

On the other hand, by supplying an electric current to the focusing coil 41 in the direction as shown in FIG. 5B, the lens holder 20 is moved downwardly. In this state, an electric current is supplied to each tilt 42, 43 in a reverse direction to that of FIG. 6A. Then, the tilt coil 42 is subjected to an upward force, whereas the tilt coil 43 is subjected to a downward force. Accordingly, the lens holder 20 is moved downwardly by the focusing coil 41 and simultaneously is tilted in the direction T2 by the tilt coils 42, 43.

As described above, in order to drive the first and the second object lenses 31, 33 mounted in the lens holder 20 in the tilt direction, an electric current is supplied to the focusing coil 41 and opposite polarity and opposite-direction electric current are supplied to the tilt coils 42, 43. In an exemplary implementation, the lens holder 20 is tilted without supplying the electric current to the focusing coil and only by supplying electric currents to the tilt coils 42, 43 in the opposite directions.

Hereinafter, description will be made about the lens holder 20 being driven in the track direction by an interaction between the track coil 44, 45 and the single-pole magnets 61, 63.

As shown in FIG. 7A, the single-pole magnets 61, 63 facing to the two pairs of track coils 44, 45 are arranged such that their N poles face to each other. In this state, each pair of track coils 44a, 44b and 45a, 45b have long sides C1, C2, C3, and C4 in the focusing direction. The adjacent sides C1, C2 correspond to the N pole of the magnets 61, 63 and the other distal sides C3, C4 correspond to the extension portion 7a of the outer yoke 73, which is the S pole.

In this state, electric currents are supplied to the track coils 44a, 44b and 45a, 45b in the opposite direction. Then, electric currents of the same downward directions are supplied to the adjacent sides C1, C2, whereas electric currents of the same upward directions are supplied to the distal sides C3, C4. When magnetic field lines emanate from the N pole of the single pole magnets 61, 63 and curves to the S pole, the respective sides C1, C2, C3, and C4 are subjected a force of the same direction, which is the left-hand direction as viewed in the drawing.

As shown in FIG. 7B, electric currents are supplied to the track coils 44a, 44b and 45a, 45b in the opposite directions to those of FIG. 7A. Then, the respective sides C1, C2, C3, and C4 are subject to forces of the same direction, and in detail, they are subjected to the force of the right-hand direction as viewed in the drawing.

As described above, the first and the second object lenses 31, 33 mounted in the lens holder 20 are controlled in the track (R) direction by varying polarities and amount of electric currents supplied to the track coils 44, 45.

In the actuator according to an embodiment of the present invention, the focusing coil 41 and the tilt coils 42, 43 to adjust the lens holder 20 in the focusing and the tilt directions are provided and driven independently from each other.

Therefore, adaptiveness of the object lenses 31, 33 with respect to a system increases, and a sensitivity of the optical pickup is also improved.

Also, by providing the focusing coil 41 and the title coils 42, 43 in close contact with the inner wall of the lens holder 20, the strength of the lens holder 20 formed by injection molding is supplemented. Accordingly, in an exemplary implementation of the present invention, it is possible to increase the sensitivity at a high velocity and guarantee the high pass displacement of the second resonance frequency.

Figure 8:
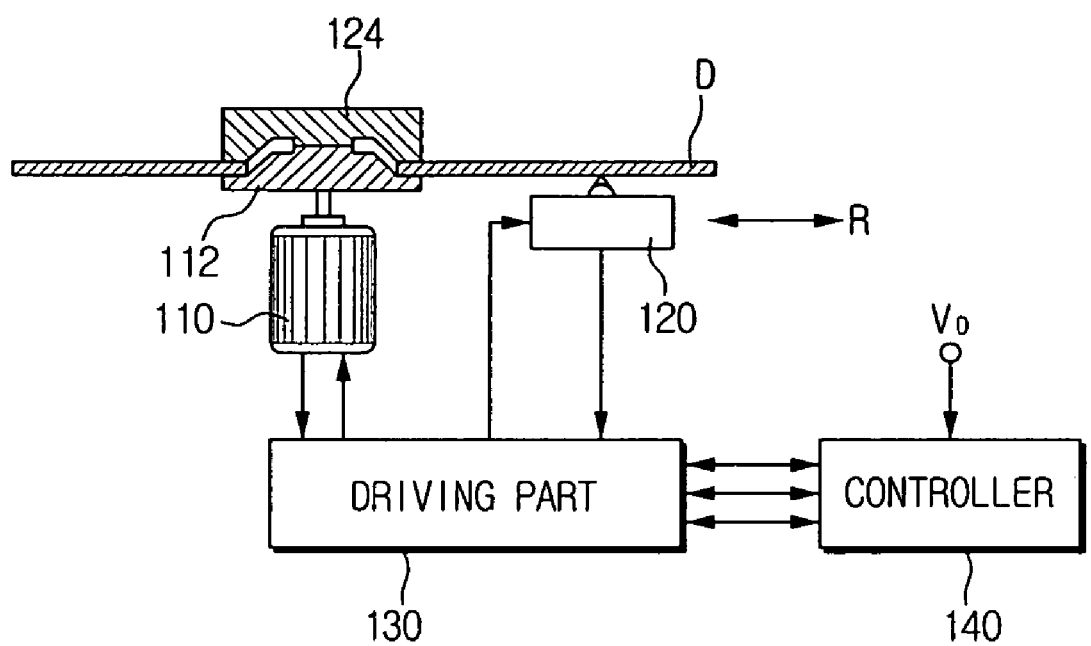
FIG. 8 is a view showing an optical recording and/or reproducing apparatus according to an exemplary embodiment of the present invention.

FIG. 8 is a view showing an optical recording and/or reproducing apparatus employing the optical pickup actuator according to an embodiment of the present invention.

Referring to FIG. 8, the optical recording and/or reproducing apparatus comprises a spindle motor 110 to rotate an optical information storage medium such as an optical disk D, an optical pickup 120 movable in a radial direction R of the optical disk D to reproduce and/or record information from and/or to the optical disk D, a driving part 130 to drive the spindle motor 110 and the optical pickup 120, and a controller 140 to control focusing, tracking and tilt servos of the optical pickup 120. The optical recording and/or reproducing apparatus further comprises a turntable 112, and a clamp 124 to chuck the optical disk D.

The optical pickup 120 comprises an optical pickup system including object lenses 31, 33 to focus laser beams emitted from a light source onto the optical disk D, and an optical pickup actuator to 3-axes drive the object lenses 31, 33. The optical pickup actuator may use the optical pickup actuator described in FIGS. 1 to 7B.

The laser beams reflected from the optical disk D are detected by a light detector provided in the optical pickup 120 and are optically converted into electric signals. These electric signals are inputted to the controller 140 through the driving part 130. The driving part 130 controls a rotation velocity of the spindle motor 110, amplifies the input signals and drives the optical pickup 120.

The controller 140 re-sends the driving part 130 commands for focusing, tracking, and tilt servos adjusted based on the input signals from the driving part 130, thereby performing the focusing, tracking and tilt operations of the optical pickup 120.

Although in the above exemplary embodiment, two object lenses 31, 33 are mounted in one single lens holder 20, this should not be considered as limiting. The object lenses 31, 33 may be mounted in only one of the two lens mounting holes 21, 23 of the lens holder 20. In this case, the above-described magnetic circuit is used to easily adjust the positions of the one object lens.

Since two and more object lenses 31, 33 are mounted in the lens holder 20, the optical pickup actuator can be applied to an optical pickup that compatibly uses different two or three kinds of optical disk such as CD, DVD, HD-DVD.

According to an exemplary implementation of the optical pickup actuator of an embodiment of the present invention, the two object lenses 31, 33 are mounted in the one lens holder 20, and the object lenses 31, 33 are driven in the focusing direction, the tilt direction and the track direction independently and simultaneously.

Therefore, adaptiveness at a high velocity can be improved, and sensitivity can be improved.

Also, since the focusing coil 41 and the tilt coil 42, 43 are disposed in close contact with the inner wall of the lens holder 20, the strength of the lens holder 20 formed by injection molding is improved.

Also, it is possible to guarantee the high-pass displacement of the second resonance frequency occurring due to the property of matter of the lens holder 20 and a gain margin.

Accordingly, the optical pickup actuator can be adaptively applied to the high velocity optical recording/reproducing apparatus.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art. Therefore, it shall be considered that such modifications, changes and equivalents thereof are all included within the scope of the present invention.

What is claimed is:

1. An optical pickup actuator comprising:
   a lens holder comprising an object lens for focusing a laser beam onto an optical information storage medium, the lens holder being movably supported by a support member and having a coil mounting portion with a closed upper side being mounted therein; and
   a magnetic circuit driving the lens holder in a focusing direction and a tilt direction independently;
   wherein the magnetic circuit comprises:
   a focusing coil disposed in an inner wall of the coil mounting portion of the lens holder;
   a pair of tilt coils disposed in the inner wall of the coil mounting portion of the lens holder and being overlapped with the focusing coil in the focusing direction and driven independently;
   a plurality of track coils supported by the lens holder to drive the lends holder in the track direction independently;
   an inner yoke disposed inside the focusing coil and the tilt coils;
   an outer yoke disposed outside the focusing coil and the tilt coils; and
   a magnet part generating a driving force in the focusing direction due to an interaction with the focusing coil and generating a driving force in the tilt direction due to an interaction with the tilt coils;
   wherein the magnet part comprises a pair of single-pole magnets facing to each other with respect to the lens holder, the single-pole magnets generating an electromagnetic force in the track direction at the neighboring sides of the track coil in the focusing direction; and
   wherein the outer yoke encloses an outer side of each single-pole magnet which is exposed in the track direction, to generate a magnetic flux in an opposite direction to a direction of magnetic flux of the single-pole magnets.

2. The optical pickup actuator as claimed in claim 1, wherein the magnet part comprises a pair of single-pole magnets which correspond to each other with respect to the lens holder and are single-pole-magnetized in the track direction of the optical information storage medium.

3. The optical pickup actuator as claimed in claim 1, wherein the pair of tilt coils neighbor each other in the track direction of the optical information storage medium.

4. The optical pickup actuator as claimed in claim 1, wherein the focusing coil is located above the tilt coils in the focusing direction.

5. The optical pickup actuator as claimed in claim 1, wherein the focusing coils is thicker than the tilt coils in the focusing direction.

6. The optical pickup actuator as claimed in claim 1, wherein working sides of the focusing coil and the tilt coils are parallel to the track direction of the optical information storage medium.

7. The optical pickup actuator as claimed in claim 1, wherein a pair of the track coils is disposed on an outer surface of the lens holder that is parallel to the track direction of the optical information storage medium, the track coils in the pair neighboring each other.

8. The optical pickup actuator as claimed in claim 1, wherein the single-pole magnets have opposite magnetic flux directions.

9. The optical pickup actuator as claimed in claim 1, further comprising a base, wherein the outer yoke is disposed on the base to support the single-pole magnets.

10. An optical pickup actuator comprising:
a lens holder mounting a plurality of object lenses to record and/or reproduce information on and/or from optical information storage media of different recording densities;
a support member movably supporting the lens holder with respect to a base; and
a magnetic circuit driving the lens holder in a focusing direction and a tilt direction independently;
wherein the magnetic circuit comprises:
a single focusing coil winding in the focusing direction to correspond to all the plurality of object lenses;
a plurality of tilt coils winding with respect to the object lenses, respectively, and disposed in the lens holder;
a pair of single-pole magnets corresponding to each other with respect to the lens holder, the pair of single-pole magnets being single-pole-magnetized in the track direction of the optical information storage medium;
four track coils, each pair of track coils being disposed at surfaces of the lens holder facing to the single-pole magnets to drive the lens holder in the track direction;
a plurality of inner yokes supported on the base and disposed inside the focusing coil and the tilt coils; and
an outer yoke disposed on the base to support the single-pole magnets;
wherein the outer yoke comprises a substantially bracket-shaped cross section in the focusing direction, and encloses the single-pole magnets; and
wherein the lens holder comprises a coil mounting portion accommodating the focusing coil and the tilt coils stacked one on the other in the focusing direction, the coil mounting portion having a closed upper side.

11. The optical pickup actuator as claimed in claim 10, wherein the pair of single-pole magnets have opposite magnetic flux directions.

12. The optical pickup actuator as claimed in claim 10, wherein the track coils are effective coils, whereby neighboring sides of the track coils are parallel to the focusing direction and interact with the single-pole magnets.

13. The optical pickup actuator as claimed in claim 10, wherein a portion extending from the outer yoke to neighbor with the single-pole magnets in the track direction faces to distal sides of the track coils which are distanced away from each other in the track direction.

14. An optical recording and/or reproducing apparatus comprising:
an actuator to drive an object lens;
an optical pickup movable in a radial direction of an optical information storage medium, the optical pickup recording and/or reproducing information on/from the optical information storage medium; and
a controller controlling a focusing servo, a track servo, and a tilt servo;
wherein the actuator comprises:
a lens holder mounting an object lens, and movably supported by a support member, the lens holder being movable with respect to a base; and
a magnetic circuit driving the lens holder in a focusing direction and a tilt direction independently;
wherein the magnetic circuit comprises:
a pair of tilt coils disposed in the lens holder and neighboring with each other in a track direction of the optical information storage medium;
a single focusing coil stacked with the tilt coils one on the other in the focusing direction;
a pair of single-pole magnets corresponding to each other with respect to the lens holder and having opposite magnetic flux directions;
four track coils supported by the lens holder, each pair of track coils corresponding to each single-pole magnet to drive the lens holder in the track direction;
a plurality of inner yokes supported on the base and disposed inside the focusing coil and the tilt coils; and
an outer yoke disposed on the base to support the single-pole magnets;
wherein the outer yoke comprises a substantially bracket-shaped cross section in the focusing direction, and encloses the single-pole magnets; and
wherein the lens holder comprises a coil mounting portion accommodating the focusing coil and the tilt coils stacked one on the other in the focusing direction, the coil mounting portion having a closed upper side.

15. The optical recording and/or reproducing apparatus as claimed in claim 14, wherein the focusing coils are thicker than the tilt coils in the focusing direction.

* * * * *

UNITED STATES PATENT AND TRADEMARK OFFICE
CERTIFICATE OF CORRECTION

PATENT NO. : 7,643,386 B2  Page 1 of 1
APPLICATION NO. : 11/311390
DATED : January 5, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Sixteenth Day of November, 2010

David J. Kappos
*Director of the United States Patent and Trademark Office*